Patented June 24, 1947

2,422,951

UNITED STATES PATENT OFFICE 2,422,951

COLD STERILIZING SOLUTIONS

Goldsmith Hall Conant, Jr., Albany, N. Y.

No Drawing. Application April 11, 1942,
Serial No. 438,643

1 Claim. (Cl. 167—19)

This invention relates to sterilizing solutions suitable for sterilizing metallic instruments and for preventing the rusting or corrosion of the instruments. In the form disclosed the solutions are effective in the cold, that is, they effectively sterilize metallic instruments without the aid of heat.

The invention is herein disclosed in some detail as embodied in solutions containing salts of ammonia and of the ethanolamines, which when alkaline, inhibit rust, and also containing mercury salts with which the ammonia and amine salts form stable soluble mercury-salt complexes.

Other more complex soluble amines have proved useful, such as isopropanolamine, to form the complex soluble salts.

The solutions herein described are water solutions, to which high boiling fluids, such as glycols may be added to prevent evaporation of the water.

Example I

The following solution was found to be an effective cold sterilizing solution:

| | | |
|---|---|---|
| Triethanolamine | per cent | 10 |
| Propylene glycol | do | 20 |
| Nitric acid | do | 1 |
| Mercuric nitrate | | 1/1000 |

It was found that the proportions of materials could be varied widely.

Example II

Another useful cold sterilizing solution contained:

| | | |
|---|---|---|
| Ammonium thiocyanate | per cent | 5 |
| Propylene glycol | do | 25 |
| Mercuric thiocyanate | | 1/1000 |

The proportions could be varied.

Example III

Another useful cold sterilizing solution contained:

| | | |
|---|---|---|
| Ethanolamine (mono- or di- or tri-) | per cent | 10 |
| Propylene glycol | do | 25 |
| Nitric acid | do | 1 |
| Phenyl mercuric nitrate | | 1/1000 |

The proportions could be varied provided the solution was alkaline.

Example IV

Another useful cold sterilizing solution contained:

| | | |
|---|---|---|
| Triethanolamine (or the mono- or di-) | per cent | 10 |
| Boric acid | do | 4 |
| Propylene glycol | do | 20 |
| Phenyl mercuric borate | | 1/1000 |

The proportions could be varied.

In all the foregoing the balance may be water.

The amine present reacts with the free acid.

Having thus described certain embodiments of the invention, what is claimed is:

A cold sterilizing solution including the reaction product of the mixing of a phenyl mercury compound selected from the group consisting of the nitrate and the borate, a much larger amount of an ethanol amine, and an acid selected from said group in an amount insufficient to neutralize said amine, and water holding the reaction product and amine in solution.

GOLDSMITH HALL CONANT, Jr.

REFERENCES CITED

The following references are of record in the file of this patent:

UNITED STATES PATENTS

| Number | Name | Date |
|---|---|---|
| 1,590,372 | Harold | June 29, 1926 |
| 2,108,765 | Domagk | Feb. 15, 1938 |
| 2,216,842 | Johnson | Oct. 8, 1940 |
| 1,862,896 | Kharasch | June 14, 1932 |
| 1,946,080 | Kern | Feb. 6, 1934 |
| 1,988,584 | Dana et al. | Jan. 22, 1935 |
| 2,014,676 | Weed | Sept. 17, 1935 |
| 2,126,173 | Clapsadle | Aug. 9, 1938 |
| 2,347,012 | Waugh | Apr. 18, 1944 |

FOREIGN PATENTS

| Number | Country | Date |
|---|---|---|
| 360,405 | Great Britain | Oct. 30, 1931 |

OTHER REFERENCES

Petroff et al., Reprint from the Quarterly Bulletin of Sea View Hospital, July 1940, pages 374, 376, 381, 383 and 384.

Miller, "Science," June 28, 1940, vol. 91, pages 624 and 625.

Weed et al., "Journal of Infectious Diseases," vol. 49, Nov. 1931, pages 440 and 447.

Journal of American Medical Association, Apr. 14, 1934, page 1224.